United States Patent
Polmans

(10) Patent No.: US 10,953,916 B2
(45) Date of Patent: Mar. 23, 2021

(54) STEER-BY-WIRE STEERING SYSTEM HAVING DIFFERENT DAMPING AS A TURN IS ENTERED AND EXITED

(71) Applicants: THYSSENKRUPP PRESTA AG, Eschen (LI); thyssenkrupp AG, Essen (DE)

(72) Inventor: Kristof Polmans, Tarrenz (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 339 days.

(21) Appl. No.: 16/315,110

(22) PCT Filed: Jul. 3, 2017

(86) PCT No.: PCT/EP2017/066504
§ 371 (c)(1),
(2) Date: Jan. 3, 2019

(87) PCT Pub. No.: WO2018/007319
PCT Pub. Date: Jan. 11, 2018

(65) Prior Publication Data
US 2019/0225262 A1    Jul. 25, 2019

(30) Foreign Application Priority Data
Jul. 5, 2016    (DE) .................... 10 2016 008 094.9

(51) Int. Cl.
*B62D 5/04*    (2006.01)
*B62D 6/00*    (2006.01)
*B62D 3/12*    (2006.01)

(52) U.S. Cl.
CPC .............. *B62D 6/008* (2013.01); *B62D 3/12* (2013.01); *B62D 5/0472* (2013.01)

(58) Field of Classification Search
None
See application file for complete search history.

(56) References Cited

U.S. PATENT DOCUMENTS

| | | | | |
|---|---|---|---|---|
| 1,923,235 | A * | 8/1933 | Smith | B62D 7/22 |
| | | | | 188/130 |
| 2,779,603 | A * | 1/1957 | McRae | B60G 7/04 |
| | | | | 280/124.136 |

(Continued)

FOREIGN PATENT DOCUMENTS

| CN | 103419835 A | 12/2013 |
|---|---|---|
| CN | 105083375 A | 11/2015 |

(Continued)

OTHER PUBLICATIONS

English translation of International Search Report issued in PCT/EP2017/066504, dated Oct. 25, 2017.

*Primary Examiner* — Shelley Chen
(74) *Attorney, Agent, or Firm* — thyssenkrupp North America, LLC

(57) ABSTRACT

A steer-by-wire steering system for motor vehicles having a steering actuator that acts on the steered wheels. The steering actuator is electronically closed-loop controlled as a function of a driver's steering request and acts on the steered wheels by means of a toothed-rack steering gear. A feedback actuator transmits feedback effects from the road to a steering wheel. The steer-by-wire steering system has an evaluation unit which analyzes whether a cornering driving state is present, and has a damping device, wherein the damping device is configured so as to receive the signal of the evaluation unit and to generate, as a function of whether a bend is being entered or exited, a damping signal which damps a torque which is present at the steering wheel.

8 Claims, 2 Drawing Sheets

(56) References Cited

U.S. PATENT DOCUMENTS

| | | | | |
|---|---|---|---|---|
| 2,955,667 | A * | 10/1960 | Cota | B62D 5/22 180/428 |
| 3,086,607 | A * | 4/1963 | Cota | B62D 5/22 180/435 |
| 3,138,069 | A * | 6/1964 | Bishop | B62D 5/083 91/375 A |
| 5,307,892 | A * | 5/1994 | Phillips | B62D 5/09 180/422 |
| 7,286,919 | B2 * | 10/2007 | Nordgren | B60G 17/018 280/5.515 |
| 8,640,809 | B2 * | 2/2014 | Whinnery | B62K 11/04 180/219 |
| 8,775,024 | B2 * | 7/2014 | Hara | B62K 21/08 701/41 |
| 8,783,719 | B2 * | 7/2014 | Huber | B62D 1/192 280/777 |
| 9,150,240 | B2 * | 10/2015 | Schnitzer | F16F 7/06 |
| 9,290,197 | B2 * | 3/2016 | Kern | B62D 1/184 |
| 10,029,725 | B2 * | 7/2018 | Schulz | B62D 5/005 |
| 2003/0047903 | A1 * | 3/2003 | Hasegawa | B62K 21/08 280/272 |
| 2003/0047904 | A1 * | 3/2003 | Hasegawa | B62K 21/08 280/272 |
| 2007/0088475 | A1 * | 4/2007 | Nordgren | B60G 17/018 701/37 |
| 2008/0281488 | A1 * | 11/2008 | Ryu | B60G 17/016 701/38 |
| 2009/0024281 | A1 | 1/2009 | Hwang | |
| 2009/0302557 | A1 * | 12/2009 | Hara | F16F 9/125 280/5.512 |
| 2011/0163516 | A1 * | 7/2011 | Whinnery | B62J 27/00 280/296 |
| 2017/0158222 | A1 * | 6/2017 | Schulz | B62D 5/006 |

FOREIGN PATENT DOCUMENTS

| | | |
|---|---|---|
| DE | 198 36 679 A | 2/2000 |
| DE | 102 48 343 A | 8/2003 |
| DE | 102 60 752 A | 7/2004 |
| DE | 10 2007 027 948 A | 12/2008 |
| EP | 1 710 148 A | 10/2006 |
| WO | 2013/093584 | 6/2013 |

* cited by examiner

STEER-BY-WIRE STEERING SYSTEM HAVING DIFFERENT DAMPING AS A TURN IS ENTERED AND EXITED

CROSS REFERENCE TO RELATED APPLICATIONS

This application is a U.S. National Stage Entry of International Patent Application Serial Number PCT/EP2017/066504, filed Jul. 3, 2017, which claims priority to German Patent Application No. DE 10 2016 008 094.9, filed Jul. 5, 2016, the entire contents of both of which are incorporated herein by reference.

FIELD

The present disclosure generally relates to a steer-by-wire steering system for motor vehicles.

BACKGROUND

In the case of steer-by-wire steering systems, the position of the steered wheels is not coupled directly to the steering wheel. There is a connection between the steering wheel and the steered wheels by means of electrical signals. The driver's steering request is tapped off by a steering angle sensor, and the position of the steered wheels is closed-loop controlled as a function of the driver's steering request by means of a steering actuator. There is no provision of a mechanical connection to the wheels, with the result that after the steering wheel has been activated there is no force feedback, e.g. corresponding feedback when parking, where, for reasons of comfort, a lower expenditure of force is desired, or in the case of conventional straight-ahead travel during which a relatively high steering torque, corresponding to the reaction of the vehicle, is desired. In order to simulate the feedback effects from the road to the steering wheel in the case of steer-by-wire steering systems, it is necessary to provide a feedback actuator (FBA) at the steering wheel or the steering column, which feedback actuator (FBA) impresses a steering sensation on the steering handle as a function of the feedback effects. In the case of cornering, reaction forces act as transverse forces on the steering gear, which reaction forces are simulated by the feedback actuator in the form of a torque which is opposed to the steering direction. As a result, the driver experiences a damped steering sensation. This function additionally ensures that the steering wheel is damped when it is released and is returned to the central position without oscillations. In this context, the FBA according to the prior art does not differentiate whether the motor vehicle is entering or exiting the bend. The damping is constant. However, this differentiation is important in respect of the actuation of the FBA, because different steering sensations are expected by the driver, and in order to be able to represent the system behavior which is improved for the driver and a vehicle.

Thus a need exists for a steer-by-wire steering system for motor vehicles which has a feedback actuator which makes available an improved steering sensation during cornering.

DETAILED DESCRIPTION

Figure 1:
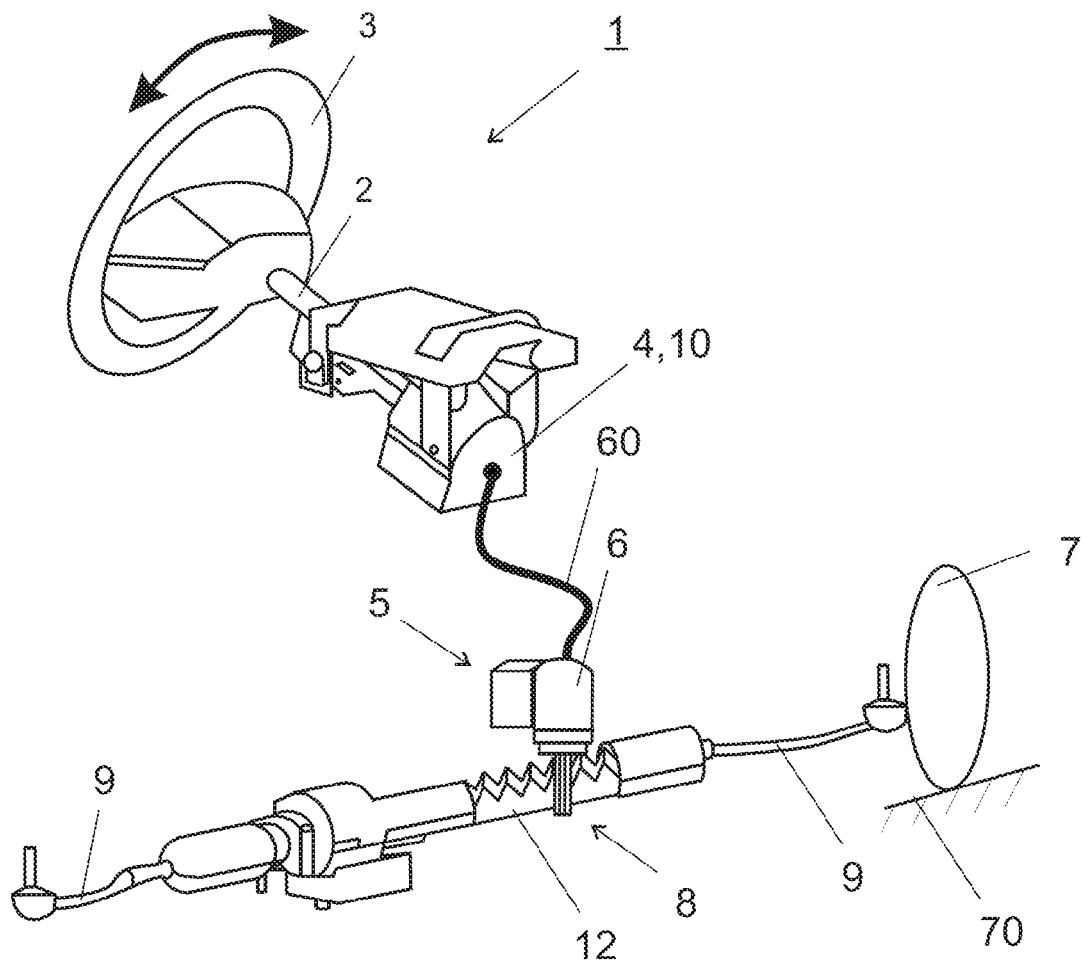
FIG. 1 is a schematic view of a steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a steer-by-wire steering system for motor vehicles having a steering actuator, which acts on the steered wheels, is electronically closed-loop controlled as a function of a driver's steering request and acts on the steered wheels by means of a toothed-rack steering gear, having a feedback actuator, which transmits feedback effects from the road to a steering wheel, is provided, wherein the steer-by-wire steering system has an evaluation unit which analyzes whether a cornering driving state is present, and has a damping device, wherein the damping device is configured so as to receive the signal of the evaluation unit and to generate, as a function of whether a bend is being entered or exited, a damping signal which damps a torque which is present at the steering wheel.

The feedback actuator can therefore make available an improved steering sensation even in the case of cornering, because when a bend is entered a steering sensation which is damped as little as possible is desirable, with the result that the driver has the sensation of steering independently. In contrast thereto, when exiting the bend the driver expects stronger damping, which permits improved return of the steering wheel with low oscillations to said driver and allows the central position for subsequent straight-ahead travel to be found.

The damping signal is preferably impressed on an electric motor of the feedback actuator. However, there can also be provision for the feedback actuator to have, in addition to the electric motor, a damping element which can be actuated by the damping device with the damping signal.

Furthermore, a method for controlling a steer-by-wire steering system for motor vehicles having the following method steps is provided:

Measuring a steering angle which is impressed on the steering wheel and a steering speed while the motor vehicle is traveling and transmitting the signals to an evaluation unit;

Detecting by means of the evaluation unit whether cornering is present and whether the state is a bend being entered or a bend being exited;

Communicating the cornering driving state to a damping device;

Defining damping as a function of the cornering driving state by means of the damping device;

In the case of a bend being exited, increased damping of the torque which is present at the steering wheel, by means of the damping which is defined by the damping device.

The increased damping in the case of a bend being exited is preferably carried out as a function of the vehicle speed and/or the steering angle speed and/or the steering angle and/or the torque which is present at the steering wheel and/or the steering wheel torque.

It can also be advantageous if, in the case of a bend being entered, the torque which is present at the steering wheel is damped, with a value which is lower than a value in the case of the bend being exited.

It is preferred that in the case of a bend being entered the damping is constant.

As already mentioned above, the damping can be carried out by means of the electric motor or a damping element of the feedback actuator. It is preferred here if the damping element generates friction in order to damp the torque at the steering wheel.

In a further embodiment there is additionally provision that the angle-dependent profile of the torque which is present at the steering wheel has an irregularity in the central position. However, the driver can also be informed when the central position of the steering wheel is reached by means of an electrically or electronically generated signal.

Although a steer-by-wire steering system is illustrated here, for example, the invention can also be applied to an electromechanical power-assisted steering system with mechanical coupling between the steering wheel and the electronically closed-loop controlled steering gear. In this context, the power-assisted steering system has an evaluation unit which analyzes a cornering driving state and damps, as a function thereof, a torque which is present at the steering wheel.

A steer-by-wire steering system 1 is shown in FIG. 1. A rotational angle and torque sensor (not illustrated) is mounted on a steering shaft 2, which rotational angle and torque sensor senses the driver's steering torque applied by turning the steering wheel 3. Furthermore, a feedback actuator 4 is mounted on the steering shaft 2, which feedback actuator 4 serves to transmit the feedback effects from the roadway 70 to the steering wheel 3 and therefore to provide the driver with feedback about the steering and driving behavior of the vehicle. The driver's steering request is transmitted to a control unit 5 via signal lines 60 by means of the rotational angle of the steering shaft 2 which is measured by means of the rotational angle sensor. The control unit 5 actuates, as a function of the signal of the rotational angle sensor and of other input variables such as e.g. the vehicle speed, yaw rate and the like, an electrical steering actuator 6 which controls the position of the steered wheels 7. The steering actuator 6 acts indirectly on the steered wheels 7 via a toothed-rack steering gear 8 and track rods 9 and other components. The feedback actuator 4 has an electric motor 10 which is actuated by the control unit 5.

Figure 2:
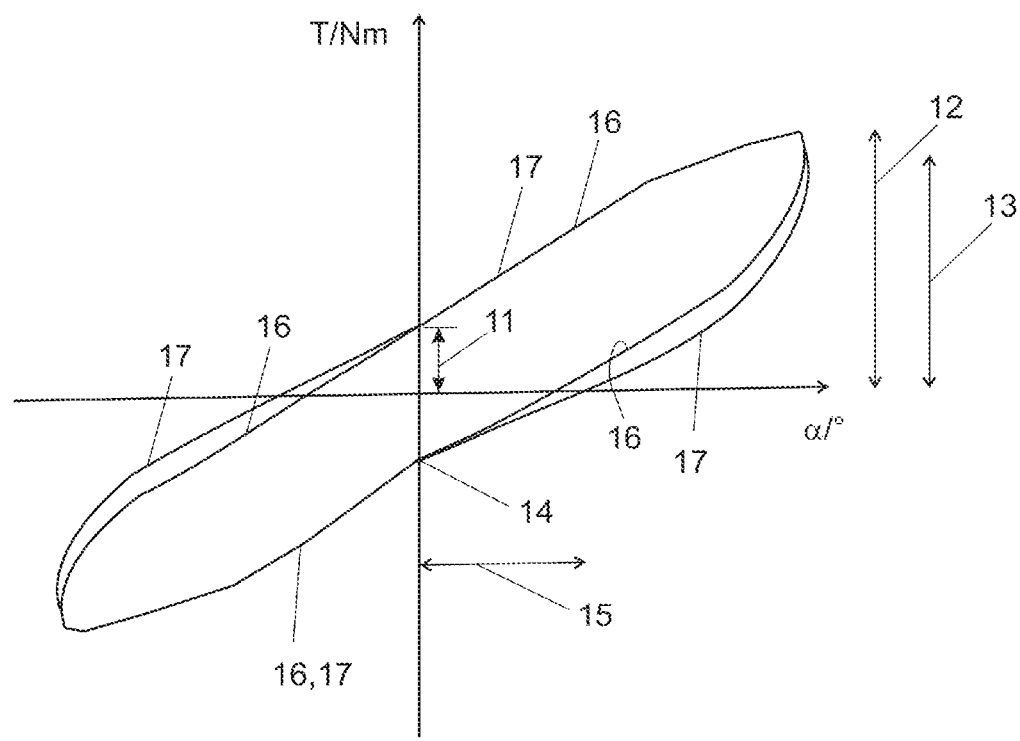
FIG. 2 is a profile of damping by means of a hysteresis curve.

FIG. 2 shows a hysteresis profile of the steering torque plotted against the steering wheel rotational angle, which steering torque is predefined by the feedback actuator 4. When starting to steer (steering wheel angle=0°), a steering torque 11 must be applied by the driver. The largest torque 12 is the torque which occurs at the maximum steering wheel lock when driving. If the driver steers back from the maximum steering wheel angle, he must apply the maximum holding torque 13. When the steering wheel is released, the steering system would return automatically to a steering torque of zero. In this context there may be provision that the steering wheel runs back to the central position 14 or as a far as a remaining residual angle 15, as illustrated here.

The steering sensation is optimized according to the invention by virtue of the fact that different damping of the steering torque is impressed as a function of a bend being entered or exited.

First, the cornering driving state is determined by means of a comparison of the signs of the measured steering angle and of the measured steering speed, and a differentiation is made between entering and exiting a bend. The damping is subsequently adapted to the cornering driving state.

Figure 3:
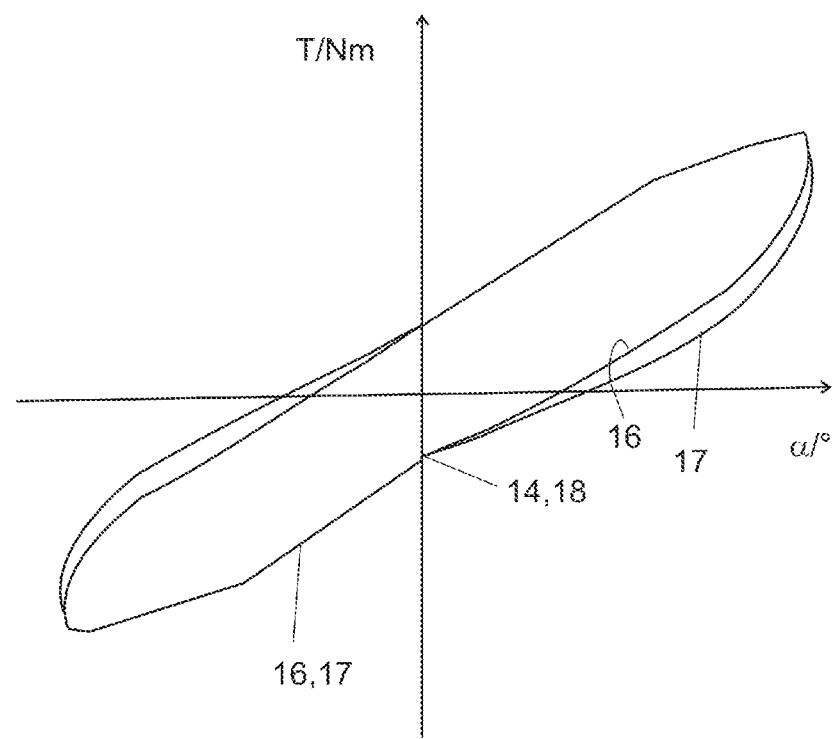
FIG. 3 is a profile of damping with an irregularity in the central position.

FIGS. 2 and 3 illustrate the damping by means of friction, by means of hysteresis curves 16 and 17.

A first hysteresis curve 16 shows a profile with constant damping. A second hysteresis curve 17 shows the inventive adaptation of the damping; when a bend is driven into there is constant damping present, with which damping the steering wheel subsequently is turned back when it is released. In contrast, when the bend is being exited, stronger damping occurs. The returning to the straight-ahead position when exiting a bend occurs more slowly compared with steering in when entering a bend, as a result of the relatively high friction.

The respective necessary damping can be made available by means of friction which is determined as a function of the vehicle speed and/or the steering angle speed and/or the steering angle and/or the torque which is present at the steering wheel.

The damping can also be set by means of the feedback actuator 4.

In one preferred embodiment, the steer-by-wire steering system 1 has an evaluation unit which decides whether a cornering driving state is present. If a cornering driving state has been detected, the evaluation unit determines whether a bend is being entered or exited. Furthermore, a damping device is provided which receives a signal from the evaluation unit and generates a damping signal as a function of the signal. This damping signal is passed onto the control unit 5 which in turn actuates the electric motor 10 of the feedback actuator 4 with corresponding damping. In addition to the electric motor 10 it is also possible to provide a damping element which transmits a restoring torque to the steering wheel. In this context, in one embodiment the damping element can be capable of being set in accordance with the damping signal of the damping device. For example, the damping device can be a damping coil or an element with a magnetorheological fluid which can be introduced into the electric motor in a space-saving and cost-effective fashion.

In FIG. 3, the hysteresis curves 16, 17 show an irregularity 18 in the central position 14. In this embodiment, the driver can clearly sense when the straight-ahead position 14 of the steering wheel 3 is reached as a result of the irregularity in the profile of the steering torque when plotted against the steering wheel rotational angle. It is also possible to provide to signalize the reaching of the central position to the driver by an electrically generated vibration of the steering wheel or an electronically generated noise.

The steer-by-wire steering system according to the invention makes available an improved steering sensation as a result of adaptive damping of the torque at the steering wheel, even in the case of cornering.

What is claimed is:

1. A steer-by-wire steering system for motor vehicles, comprising
a steering actuator configured to act on steered wheels of the motor vehicle through a toothed-rack steering gear, the steering actuator electronically closed-loop controlled as a function of a steering request,
a feedback actuator, which transmits feedback effects from the road to a steering wheel,
an evaluation unit configured to detect a cornering driving state and generate signals indicative thereof, and
a damping device configured to receive the signals from the evaluation unit and to generate based thereon, as a function of whether a bend is being entered or exited, a damping signal which damps a torque which is present at a steering wheel of the motor vehicle,
wherein the feedback actuator includes an electric motor configured to receive the damping signal and correspondingly actuate,
and the feedback actuator includes a damping element configured to be actuated by the damping device as a function of the damping signal,
wherein the damping element generates friction in order to damp the torque at the steering wheel, which is determined in accordance with the vehicle speed and/or the steering angle speed and/or the steering angle and/or the torque which is present at the steering wheel.

2. A method for controlling a steer-by-wire steering system for motor vehicles, wherein the steer-by-wire steering system includes a steering actuator, which acts on the steered wheels and is electronically closed-loop controlled as a function of a steering request, and a feedback actuator which transmits feedback effects from the road to a steering wheel, comprising:
measuring a steering angle of the steering wheel and a steering speed while the motor vehicle is traveling, and transmitting the signals to an evaluation unit;
detecting a cornering driving state, by the evaluation unit, based on when cornering is present and whether a bend being entered or exited;
communicating the cornering driving state to a damping device;
defining, by the damping device, damping as a function of the cornering driving state; and
when a bend exit is detected, increasing damping of the torque at a steering wheel of the motor vehicle, by the damping which is defined by the damping device,
wherein the damping device actuates a damping element of the feedback actuator, which damping element damps, as a function of the damping signal, the torque which is present at the steering wheel,
wherein the damping element generates friction in order to damp the torque at the steering wheel, which is determined in accordance with the vehicle speed and/or the steering angle speed and/or the steering angle and/or the torque which is present at the steering wheel.

3. The method of claim 2, wherein the increased damping, when a bend is being exited, is carried out as a function of a vehicle speed and/or the steering angle speed and/or steering angle and/or the torque which is present at the steering wheel.

4. The method of claim 2, comprising:
damping of the torque which is present at the steering wheel, when a bend is being entered, with a value which is lower than a value in the case of the bend being exited.

5. The method of claim 4, wherein when a bend is being entered the damping is constant.

6. The method of claim 2, wherein the damping device impresses the damping on an electric motor of the feedback actuator.

7. The method of claim 2, wherein that the angle-dependent profile of the torque which is present at the steering wheel has an irregularity in a central position.

8. The method of claim 2, wherein a signal is generated electrically or electronically when a central position of the steering wheel is reached.

* * * * *